Figure 1:
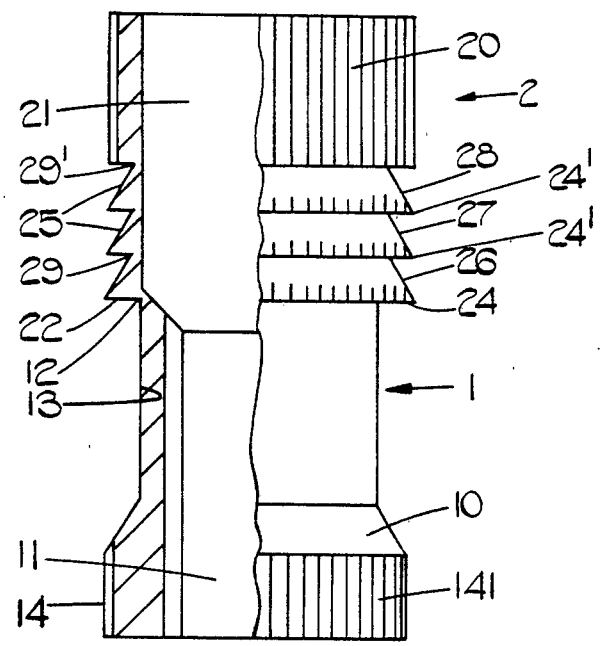

United States Patent [19]

Ringham

[11] 4,371,300

[45] Feb. 1, 1983

[54] INSERT

[75] Inventor: Stanley A. Ringham, Ilford, England

[73] Assignee: Adbar (Patent Co.) Limited, Warwickshire, England

[21] Appl. No.: 227,928

[22] Filed: Jan. 23, 1981

[30] Foreign Application Priority Data

Jan. 26, 1980 [GB] United Kingdom ............... 8002720

[51] Int. Cl.³ ............................................. F16B 13/06
[52] U.S. Cl. .................................... 411/41; 411/71
[58] Field of Search ............... 411/40, 41, 42, 39, 411/33, 32, 73, 72, 71, 44, 57, 76

[56] References Cited

U.S. PATENT DOCUMENTS

| | | | |
|---|---|---|---|
| 3,427,919 | 2/1969 | Lerich | 411/39 |
| 3,465,637 | 9/1969 | Cushman | 411/40 |
| 4,307,986 | 12/1981 | Barnsdale | 411/41 |

FOREIGN PATENT DOCUMENTS 2068072 8/1981 United Kingdom ............... 411/41

Primary Examiner—Robert L. Wolfe
Attorney, Agent, or Firm—Watson, Cole, Grindle & Watson

[57] ABSTRACT

An insert for installation in a hole therefor in parent member comprises a body having an exterior increase in diameter between larger and smaller diameter ends and a ferrule adapted to be axially driven about the exterior of the body when the latter is end located by its larger diameter end in a hole therefor in parent material whereby the ferrule is expanded as a result of co-action with the body. The ferrule is annularly grooved to provide one or more forwardly directed portions therefrom shown of forwardly and outwardly inclined taper form at or adjacent the leading end of the ferrule and having a thin section connection therewith at the annular groove or grooves so that on axial co-action of the ferrule with the body the forwardly directed portion or portions effect radial expansion of the ferrule into taper engagement with the wall of the hole in order to lock the ferrule and body in the hole with a taper locking action against axial pull out. Where two or more successive forwardly directed portions are provided they have a telescopic or collapsing action so that a subsequent forwardly directed portion is expanded by a preceding one.

10 Claims, 4 Drawing Figures

INSERT

This invention relates to inserts for fixing, fastening or locating purposes wherein the insert is for installation in a hole therefor in parent material and is concerned with such an insert of the kind consisting of a body member at least part of the exterior of which provides an increase in diameter between larger and smaller diameter ends thereof and a radially expansible sleeve or ferrule adapted to be axially driven about the exterior of the body member when the latter is positioned by its larger diameter end in a hole therefor in parent material whereby the sleeve or ferrule is expanded as a result of co-action with the body member to cause the leading end of the ferrule to have a taper engagement with the wall of the hole in order to lock itself and the body member therein. Such inserts usually, but not necessarily, have a threaded bore for receiving a threaded member such as a screw and for example are for use in components of metal, plastics or other material or for similar use. Inserts of this general kind are set forth in the specifications of British Pat. Nos. 1,306,357 and 1,522,597.

The object of the present invention is to provide an improved insert of the abovementioned kind whereby rapid installation of the insert is readily obtained together with a high degree of resistance to axial pull-out of the installed insert. Practical advantages in these respects will be apparent from the following disclosure.

According to the invention an insert of the kind referred to is characterised by the exterior of the ferrule being annularly grooved to provide at least one forwardly directed portion from said groove at or adjacent the leading end of the ferrule and having a thin section connection therewith at the annular groove whereby on the ferrule being axially driven about the exterior of the body member and co-acting with the latter at the increase in exterior diameter thereof, the or each forwardly directed portion effects a radial expanding action of the ferrule into taper engagement with the wall of a said hole receiving the insert in order to lock the ferrule and body member in the hole with a taper locking action against axial pull out of the insert from the hole.

Preferably the ferrule is annularly grooved to provide two or more forwardly directed portions in axial succession from respective grooves and having a thin section connection between them and between the rearmost of said portions and a rear remaining part of the ferrule at said grooves whereby on the ferrule being axially driven about the exterior of the body member and co-acting therewith, the thin section connection between the said portions breaks or yields to permit their telescopic or collapsing action so that the or each subsequent forwardly directed portion is expanded by a preceding said portion so as to have, or each have, a taper engagement with the wall of a said hole in order to lock the ferrule and body member in the hole.

Figure 2:
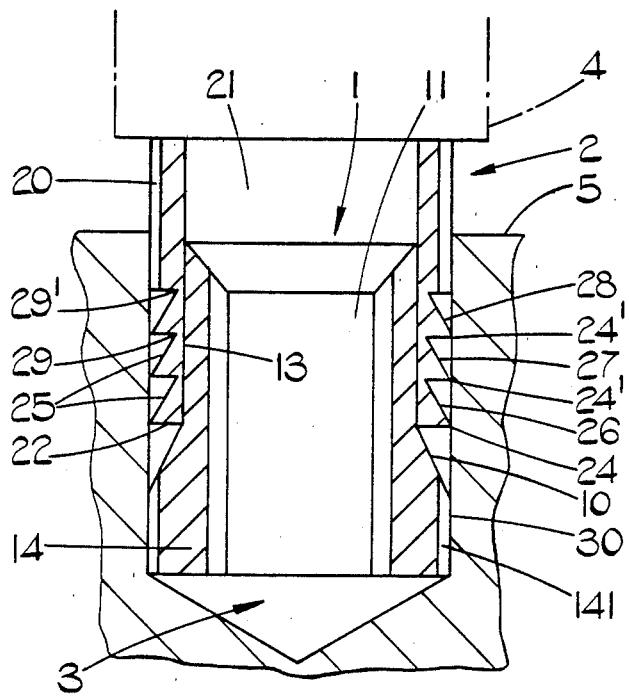
Figure 3:
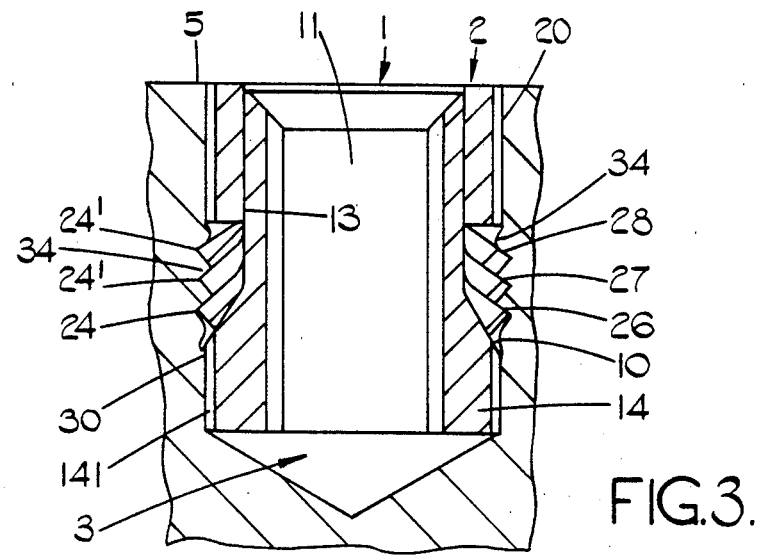
Figure 4:
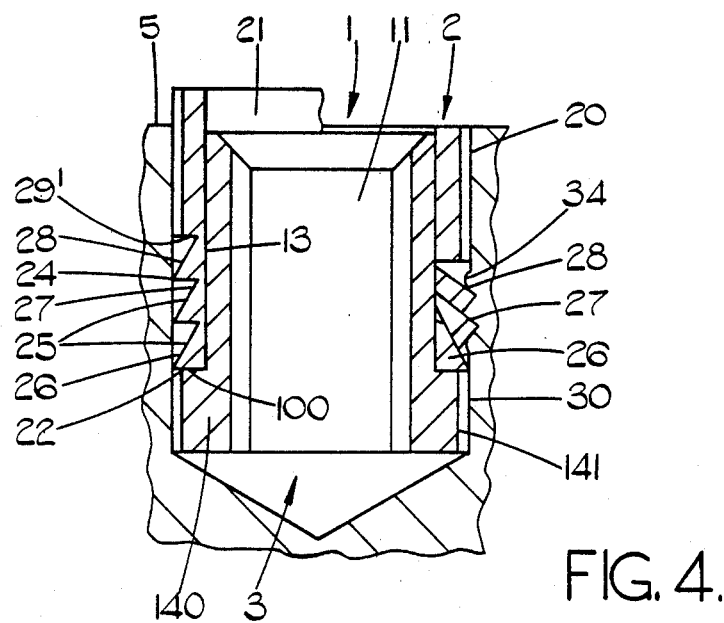

The accompanying drawings show typical forms of the insert on a considerably enlarged scale for clarity and in which:

FIG. 1 is an axial plane half-section of the insert in its initial condition prior to installation, FIG. 2 is an axial plane section of the insert at the commencement of installation, FIG. 3 is an axial plane section of the fully installed insert, and FIG. 4 is a composite axial plane section showing a modification.

The insert is shown comprising a body member 1 and a sleeve or ferrule 2 which latter may be intially integral with the body 1 by a thin section connection or junction 12. The insert body 1 is of external taper form at 10 and is shown provided with an internal threaded bore 11 for receiving a screw or similar threaded member or the bore may be plain for location or similar purposes.

The exterior of the ferrule 2 is shown longitudinally serrated at 20 and the internal bore 21 of the ferrule is shown of plain parallel form of a diameter substantially the same as the external diameter of the smaller end of the body 1. If desired the serrations 20 may only extend for part of the length of the ferrule 2 from the leading end thereof whilst the serrations 20 may have some inclination from the straight longitudinal direction by having a slight spiral form.

For the purpose of this invention that part of the ferrule adjacent the leading end 22 is annularly grooved at 25 to provide one, or more than one, forwardly directed portions 26 also shown of outwardly inclined annular taper form (e.g. of buttress form) having a thin section connection 29 with the ferrule 2. In the example shown two further successive forwardly directed portions 27, 28 are provided by and from corresponding annular grooving 25 and each having a thin section connection 29 between them. However the number of taper portions 26 etc. may vary according to requirements and especially as regards the size of the insert.

Also in the example shown the forward end of the first taper portion 26 is at the leading end 22 of the ferrule where the serration 20 provides cutting teeth 24 thereat, whilst the following taper portions 27, 28 similarly have cutting teeth 24' provided by the serration 20.

The thin section connection 29 between the taper portions 26, 27, 28 is preferably slightly thicker and hence stronger than that at 12 between the leading end 22 of the ferrule 2 and the smaller diameter end of the body 1, whilst the following taper portions 27, 28 may have thin section connections 29 which are progressively thicker and thus stronger than the preceding thin section connection 29 of the first taper portion 26. However, for ease of manufacture the taper portions 26, 27 28 and thin section connections 29 are preferably uniform. Again in the example shown the diameter of the ferrule 2 including the larger diameter of the taper portions 26, 27 and 28 is the same as that of the larger diameter portion 14 of the body 1 although there may be some variation in this respect.

Referring to FIGS. 2 and 3 and in installing the insert it is placed body first in a hole 3 therefor of appropriate diameter in parent material 5 with its larger diameter end or base against or adjacent to the bottom or inner end of the hole 3 or is otherwise end located in relation to the hole 3 (e.g. by a shoulder or by a stop pin or a support plate to a through hole 3 during installation).

The depth of the hole 3 is such that the ferrule 2 in its initial condition integrally connected with the body 1 protrudes for a major part of its length out of the hole 3 above or beyond the surface of the parent material 5. On the ferrule 2 and body 1 being subject to relative axial pressure such as by axial force applied to the ferrule 2, e.g. by an installation tool indicated at 4 (FIG. 2), the thin section connection 12 first breaks and the ferrule moves axially along the cylindrical parallel diameter portion 13 of the body 1 so as to obtain such breakage and also entry of the taper portions 26, 27 and 28 within the hole 3. On the leading end 22 of the ferrule engaging and co-acting with the taper part 10 of the body 1, it is expanded thereby to engage the wall 30 of the hole 3 with a digging-in action as it is thrust radially into firm engagement therewith. A shearing action of the leading end 22 with the hole wall 30 may also take place.

Referring to FIG. 3 and as the resistance to axial movement of the first taper portion 26 thus increases, the thin section connection 29 between it and the second taper portion 27 breaks causing the latter to move over the first taper portion 26 with a telescopic action and, due to the taper form of the latter the second taper portion 27 is expanded to also engage the hole wall 30 with a taper engagement. Similar expansion of the third taper portion 28 over the second portion 27 takes place with corresponding taper engagement with the hole wall 30. Some thinning of the taper portions 26, 27 and 28 may occur.

The second and third taper portions 27, 28 are also thrust radially into engagement with the hole wall 30 and may also have a shearing action, the taper locking action obtained and also the digging-in of the taper portions 26, 27 and 28 into the hole wall 30 firmly retaining the insert in the hole 3 against axial pull out. In fact as the pull-out load on the body 1 increases, the taper portions 26, 27 and 28 are thrust even more firmly into one another causing an increasing expanding and taper locking action.

Again due to the increased resistance to forward axial movement of the taper portions 26, 27 and 28 final axial movement of the ferrule 2 may cause the rearmost thin section connection 29' to break so that the remainder of the ferrule 2 moves closely against the expanded third taper portion 28 and may be subject to some axial spreading causing it to engage the hole wall with a taper locking action.

The digging-in action of the taper portions 26, 27 and 28 may cause some local inward bulging of the hole wall 30 as at 34 in FIG. 3 to further effect retention of the insert in the hole.

Whereas the expanding and taper locking action of the taper portions 26, 27 and 28 is generally as that described above, initial practical tests have indicated that there may be some variation dependent on the extent of relative axial movement of the ferrule 2 and body 1 on installation and also localised loading on the taper portions 26, 27 and 28 as they engage the hole wall 30. Thus the effect obtained may be that the annular grooving 25 permits axial compression or collapsing of the ferrule 2 with or without breakage of some or all of the thin section connections 29 and causing some distortion and outward expansion of the taper portions 26, 27 and 28.

Where as shown the larger diameter end or base portion 14 of the body 1 and that of the ferrule 2 are substantially the same, the base portion 14 of the body 1 may be also serrated as at 141 to further assist in obtaining anti-rotational locking of the body 1 in the hole 3.

If desired the ferrule 2 may be provided detached from the body 1 but pushed over the parallel diameter portion 13 of the latter, i.e. in the same manner shown in FIG. 2. After placing the insert assembled in this way in a hole 3 the ferrule 2 is then subjected to axial force causing the telescopic or similar action and expansion of the taper portions 26, 27 and 28 in the manner already described and shown in FIG. 3. However the extent of in situ axial movement of the ferrule 2 relative to the body 1 during actual installation is somewhat reduced and may be effected by subjecting the outer end of the ferrule 2 to a hammer blow or similar impact.

The parallel diameter portion 13 and/or the internal bore 21 of the ferrule 2 may be knurled or similarly formed so that the separate ferrule 2 remains initially assembled on the body 1 for handling purposes and to facilitate placing the insert in a hole ready for installation.

The relatively short extent of the digging-in action of each taper portion 26, 27 and 28 with the hole wall 30 and their telescopic or similar action, facilitates installation of the insert with a minimum of axial force necessary whilst the plurality of taper locking engagements and digging-in action of the taper portions 26, 27 and 28 with the hole wall 30 provides a high degree of resistance of the insert to axial pull-out as already referred to.

Referring to FIG. 4 a modification is shown in which the larger diameter base portion 140 provides a shoulder 100 between its rear end and the parallel diameter portion 13. As shown the shoulder is at 90° to the exterior surface of the portion 13 but the angle may be varied.

On the leading end 22 of the ferrule 2 abutting the shoulder 100 the co-action obtained is that the first taper portion 26 is positively constrained against further axial movement and provides a taper surface over which the second taper portion 27 moves and is expanded thereby on forward axial movement of the ferrule 2 and breakage of the first thin section connection 29.

Continued inward axial movement of the ferrule 2 causes fracture of the second thin section connection 29 and movement and expansion of the third taper portion 28 over the second taper portion 27, i.e. in the manner already described. If provided, subsequent taper portions would have the same expanding and also digging-in action into the wall 30 of the hole 3. However, in this arrangement it will be appreciated that the first taper portion 26 which abuts the shoulder 100 is not expanded but provides a means of causing expansion of the following taper portion 27.

FIG. 4 is a composite axial plane section in that the leading end 22 of the ferrule 2 is shown firstly in contact with the shoulder 100 on the left and in the fully installed condition on the right with expansion of the second and third taper portions 27, 28.

As before the leading end 22 of the ferrule 2 may initially have a thin section connection 12 with the smaller diameter rear end of the body 1 or the ferrule 2 may be separate and pushed over the parallel diameter portion 13 preferably up to abutment with the shoulder 100 so as to provide an assembly read for installation. In the latter case a much reduced extent of axial movement of the ferrule 2 on installation is afforded.

Also as before the telescopic action of the taper portions 26, 27 and 28 facilitates installation and provides a plurality of taper locking engagements to effectively resist pull out.

I claim:

1. An insert of the character described for installation in a hole therefor in parent material comprising a round section body member of which at least part of the exterior of said body member has an increase in diameter between larger and smaller diameter ends thereof, said body member being such as to end locate by its larger diameter end in a hole therefor in parent material; and a tubular ferrule adapted to be axially driven about the exterior of the body member when the latter is end located by its larger diameter end in a said hole therefor, the exterior of the ferrule being annularly grooved to provide at least one forwardly directed portion from said groove at the leading end of the ferrule and having a thin section connection therewith at the annular groove whereby on the ferrule being axially driven about the exterior of the body member and co-acting with the latter at the increase in exterior diameter thereof, the forwardly directed portion effects a radial expanding action of the ferrule into taper engagement with the wall of a said hole receiving the insert in order to lock the ferrule and body member in the hole with a taper locking action against axial pullout of the insert from the hole.

2. An insert according to claim 1 wherein the exterior of the ferrule is annularly grooved to provide at least two forwardly directed portions in axial succession from respective grooves and having a thin section connection at said grooves between them and between the rearmost forwardly directed portion and a rear remaining part of the ferrule whereby on the ferrule being axially driven about the exterior of the body member and co-acting with the latter at the exterior increase in diameter thereof, the thin section connection between the forwardly directed portions breaks to permit their generally telescopic action so that the subsequent forwardly directed portion is expanded by the preceding forwardly directed portion so as to have a taper engagement with the wall of a said hole in order to lock the ferrule and body member in the hole with a taper locking action against axial pull out of the insert from the hole.

3. An insert according to claim 1 wherein the forwardly directed portion is of forwardly and outwardly inclined taper form.

4. An insert of the character described for installation in a hole therefor in parent material comprising a round section body member of which at least part of the exterior of said body member has an increase in diameter between larger and smaller diameter ends thereof, said body member being such as to end locate by its larger diameter end in a hole therefor in parent material; and a tubular ferrule adapted to be axially driven about the exterior of the body member when the latter is end located by its larger diameter end in a said hole therefor, the exterior of the ferrule being annularly grooved to provide at least two forwardly and outwardly inclined taper portions in axial succession from said grooves and having a thin section connection at said grooves between them and between the subsequent taper portion and a rear remaining part of the ferrule whereby on the ferrule being axially driven about the exterior of the body member and co-acting with the latter at the exterior increase in diameter thereof, the thin section connection between the taper portions breaks to permit their generally telescopic action so that the subsequent taper portion is expanded by the preceding taper portion so as to have a taper engagement with the wall of a said hole in order to lock the ferrule and body member in the hole with a taper locking action against axial pull out of the insert from the hole.

5. An insert according to claim 1 wherein the forwardly directed portion of the ferrule initially has a thin section connection with a rear smaller diameter end of the body which thin section connection is first broken as the ferrule is axially driven about the body on installation of the insert.

6. An insert according to claim 1 wherein the ferrule is provided as a separate member detached from the body and is adapted to be axially pushed over a parallel diameter portion of the body ready for further relative axial movement and said co-action therewith on installation of the insert.

7. An insert according to claim 1 wherein the forwardly directed portion of the ferrule is arranged to co-act with a taper formation of the exterior of the body on axial installation movement of the ferrule over the body in order to expand said forwardly directed portion for engagement with the wall of a hole receiving the insert and to cause expansion of any subsequent forwardly directed portion.

8. An insert according to claim 2 wherein the leading forwardly directed portion of at least two of said portions of the ferrule is arranged to abut a shoulder on the exterior of the body on axial installation movement of the ferrule over the body in order to cause expansion of a subsequent forwardly directed portion over said leading portion.

9. An insert according to claim 1 wherein the exterior of the forwardly directed portion is longitudinally serrated at at least its leading end part to provide teeth for cutting into the wall of a hole receiving the insert and anti-rotational engagement with said wall.

10. An insert according to claim 1 wherein the exterior of a leading larger diameter portion of the body is longitudinally serrated for assisting anti-rotational engagement of the insert with the wall of a hole receiving the insert.

* * * * *